US006960548B2

(12) United States Patent
Lebas et al.

(10) Patent No.: US 6,960,548 B2
(45) Date of Patent: Nov. 1, 2005

(54) METHOD FOR REGENERATING USED ABSORBENTS DERIVED FROM TREATMENT OF THERMAL GENERATOR FUMES

(75) Inventors: Etienne Lebas, Seyssuel (FR); Gérard Martin, Saint Genis Laval (FR); Christian Streicher, Rueil Malmaison (FR)

(73) Assignee: Institute Francais du Petrole, Rueil Malmaison Cedex (FR)

(*) Notice: Subject to any disclaimer, the term of this patent is extended or adjusted under 35 U.S.C. 154(b) by 164 days.

(21) Appl. No.: 10/048,167

(22) PCT Filed: May 31, 2001

(86) PCT No.: PCT/FR01/01700

§ 371 (c)(1), (2), (4) Date: Apr. 18, 2002

(87) PCT Pub. No.: WO01/91900

PCT Pub. Date: Dec. 6, 2001

(65) Prior Publication Data

US 2002/0136673 A1 Sep. 26, 2002

(30) Foreign Application Priority Data

Jun. 2, 2000 (FR) .......................................... 00 07121

(51) Int. Cl.[7] .............................................. B01J 20/34

(52) U.S. Cl. ............... 502/21; 423/244.01; 423/244.07; 423/574.1; 502/34; 502/55

(58) Field of Search .............................. 502/20, 21, 27, 502/34, 55; 423/244.01, 244.07, 574.1

(56) References Cited

U.S. PATENT DOCUMENTS

| | | | | |
|---|---|---|---|---|
| 3,764,665 A | * | 10/1973 | Groenendaal et al. ...... | 423/574 |
| 3,778,501 A | * | 12/1973 | Lang et al. ................. | 423/244 |
| 4,101,641 A | * | 7/1978 | Poll ....................... | 423/567 R |
| 5,130,282 A | * | 7/1992 | Bodart et al. ................. | 502/34 |
| 5,229,091 A | * | 7/1993 | Buchanan et al. ..... | 423/244.01 |
| 5,730,781 A | * | 3/1998 | Martin et al. ................. | 95/108 |
| 6,030,597 A | * | 2/2000 | Buchanan et al. ....... | 423/573.1 |

FOREIGN PATENT DOCUMENTS

| | | | |
|---|---|---|---|
| CA | 1136384 A | * | 11/1982 |
| DE | 29 44 754 A1 | * | 5/1980 |
| FR | 2587236 A1 | * | 3/1987 |
| FR | 2730424 A1 | * | 8/1996 |

* cited by examiner

*Primary Examiner*—Wayne A. Langel
(74) *Attorney, Agent, or Firm*—Antonelli, Terry, Stout & Kraus, LLP

(57) ABSTRACT

Process and device for regeneration of a used absorbent from a desulfurization zone or from the desulfurization of a gas containing sulfur oxides, comprising regeneration simultaneously with filtering of the absorbent, in a reducing atmosphere, wherein partial combustion of a regeneration gas is also carried out upstream from regeneration, the products of the partial combustion being mixed with the used absorbent prior to the regeneration-filtration stage. The absorbent may be, e.g., solid absorbents based on magnesium oxide. The regeneration gas may be hydrogen sulfide and/or a hydrocarbon. For example, H2S can be partially combusted and the products of the partial combustion, including $H_2S$, $H_2$, $SO_2$ and sulfur, mixed with the used absorbent prior to the regeneration-filtration stage.

12 Claims, 1 Drawing Sheet

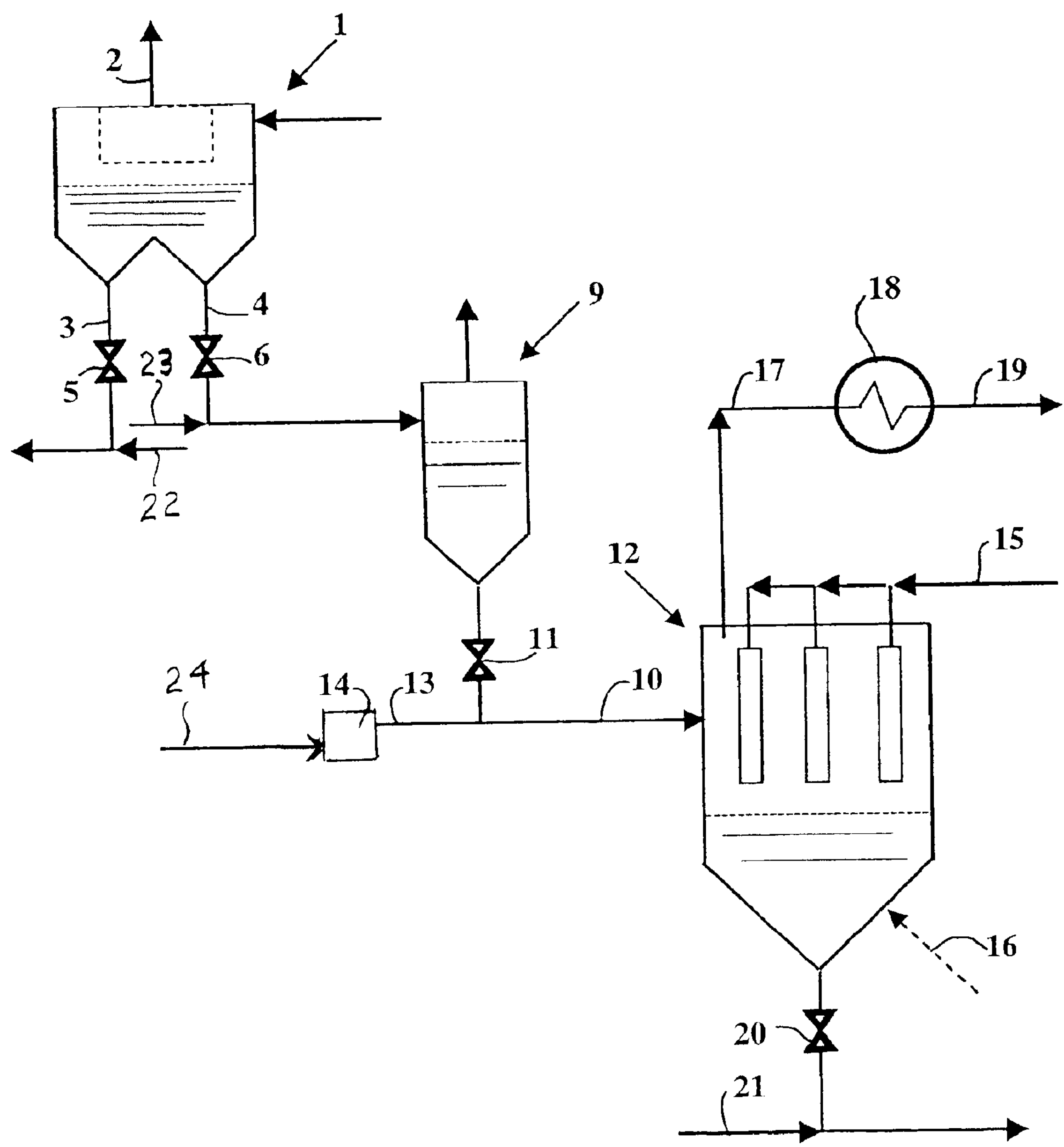
1
2
3
4
5
6
23
22
9
18
17
19
15
12
11
24
14
13
10
16
20
21

METHOD FOR REGENERATING USED ABSORBENTS DERIVED FROM TREATMENT OF THERMAL GENERATOR FUMES

FIELD OF THE INVENTION

The present invention relates to the sphere of combustion and more particularly of regeneration of absorbents used for treatment of combustion products.

BACKGROUND OF THE INVENTION

French patent FR-2,636,720, filed by the applicant, discloses a boiler wherein desulfurization agents are injected into a specific zone, referred to as desulfurization chamber, interposed between the combustion chamber and the convective exchange heat recovery zone. The desulfurization agents used in this plant are preferably non-regeneratable calcic absorbents such as lime or limestone, or industrial residues with a high calcium carbonate content (sugar mill froth, paper mill froth, etc).

Various improvements have been brought to this type of boilers in order to increase the thermal efficiency thereof while having the highest possible efficiency for trapping sulfur oxides notably.

An improvement illustrated in French patent FR-2,671,855 consists in using absorbents referred to as «regeneratable» absorbents that are regenerated in a regenerator located downstream from the boiler, after the final dust separator.

This improvement, which retains the advantages of plants using non regeneratable absorbents, notably within the scope of desulfurization, also allows to substantially limit the amounts of used absorbent to be dumped, which is favourable to the quality of the environment.

Furthermore, the significant decrease in the amounts of used absorbent to be eliminated allows to envisage inerting treatments at non-prohibitive costs.

In the plant described above, it is suggested that regeneration of the absorbent can be carried out by means of a fluidized bed or possibly of a rotary furnace.

An improvement illustrated in French patent FR-2,730,424 consists in carrying out regeneration simultaneously with filtration of the used absorbent in a single reactor.

The processes described above propose using as a regeneration gas a hydrogen-containing or hydrocarbon-containing compound with a total carbon number below 10, such as hydrogen, methane, ethane, propane, isobutane and/or a mixture of said gases. Hydrogen is the most suitable regeneration gas because it induces the lowest coking of absorbent. However, supplying hydrogen to an industrial site, a refinery for example, can pose problems. In fact, hydrogen is not always available in sufficient amount in refineries, in particular when substantial conversion and hydrodesulfurization operations are carried out.

Furthermore, the aforementioned two inventions, which allow regeneration of the absorbent, require specific equipments for the regeneration stage that are costly and numerous.

The present invention allows to eliminate drawbacks and components of prior plants while keeping the same regeneration efficiency.

Regeneration of a desulfurization absorbent by means of hydrogen sulfide is also proposed in patent FR-2,587,236. No means for carrying out the reaction is however mentioned in this patent.

SUMMARY OF THE INVENTION

The present invention thus allows to minimize the number of equipments required for the regeneration stage by proposing partial combustion of the regeneration gas upstream from the regeneration process and by combining the regeneration reaction by means of a combustion means such as a burner for example, preferably located near to the absorbent regeneration and filtration zone. The proximity of the preheating means and of the regeneration/filtration zone also allows to limit handling and transport of corrosive fumes containing hydrogen sulfide for example.

It also allows to use a regeneration gas that is readily available on the site.

Furthermore, the very nature of the regeneration gas allows to raise the conversion coefficient of the regeneration reaction, as explained hereafter.

Besides, no regeneration gas recycling is required, so that all the components linked with said recycling can be suppressed.

The object of the present invention thus is a process intended for regeneration of a used absorbent from a desulfurization zone or of any gas containing sulfur oxides, said regeneration being carried out simultaneously with filtering of said absorbent in a reducing atmosphere, wherein partial combustion of a regeneration gas is carried out upstream from said regeneration and the products from said partial combustion are mixed with the used absorbent prior to the regeneration-filtration stage.

According to another feature, the process consists in mixing an additive regeneration gas during the regeneration-filtration stage.

Said regeneration gas preferably comprises hydrogen sulfide.

It advantageously comprises a hydrocarbon, alone or with hydrogen sulfide. Incorporating a hydrocarbon fraction to the regeneration gas allows to substantially increase the hydrogen release during partial oxidation of said gas and thus advantageously favours regeneration of the absorbent. The hydrocarbon used is methane for example. It is also possible, according to the invention, to use a hydrocarbon gas such as methane at least a fraction of which is previously partly oxidized prior to contacting with the used absorbent, and which will thus generate a $CO/H_2/CO_2/H_2O$ mixture that is less coking for the absorbent than the hydrocarbon alone.

Furthermore, the gases from the regeneration-filtration stage can be cooled.

In addition, the cooled gases can be sent to a Claus plant.

According to a feature of the invention, the regenerated absorbent from the regeneration-filtration stage is mixed with a carrier gas prior to being sent to a storage unit.

According to another feature of the invention, the regenerated absorbent is mixed with a carrier gas prior to being sent to a desulfurization zone.

It is well-known to use as regeneration catalysts noble metals of group VIII, which do not only promote absorption of sulfur dioxide by solid absorbents based on magnesium oxide for example, but which also catalyze the absorbent regeneration reaction, such as for example the reduction of magnesium sulfate to magnesium oxide.

Although metals of the platinum group present the advantage of a high catalytic activity, it is well-known to the man skilled in the art that said activity decreases as a result of the degradation of such a catalyst at high temperatures (above about 900° C.). The most commonly mentioned causes for this performance degradation are the sintering of the support and the sintering of the active phase and/or its encapsulation by the support. It is also well-known that the catalytic activity of a palladium-based catalyst ranges between 800 and 1000° C. because of the equilibrium as follows:

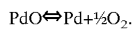
$PdO \Leftrightarrow Pd + \frac{1}{2}O_2$.

It has been found according to the present invention that copper oxide and preferably cerium oxide have a much longer life span than the catalysts used in the prior art under the temperature conditions of said regeneration. Surprisingly, it has been found that copper oxide and/or cerium oxide do not only promote absorption of sulfur dioxide by solid absorbents based on magnesium oxide for example, but that they also catalyze the absorbent regeneration reaction such as, for example, the reduction of magnesium sulfate to magnesium oxide.

According to a particular embodiment of the invention, regeneration is thus carried out in the presence of a catalyst.

The catalyst used for said regeneration stage can comprise copper oxide and preferably cerium oxide.

The used absorbent can advantageously be treated prior to being mixed with the regeneration gas. This treatment can consist of a fractionation, carried out for example by means of a cyclone, into at least two fractions, some of said fractions being rich in catalyst, the others being poor in catalyst. Said catalyst-rich fractions are preferably recycled to a desulfurization zone, and said catalyst-poor fractions are either directly sent to the regeneration zone, or advantageously separated into two streams, one being recycled to a desulfurization zone, the other being sent to the regeneration zone.

Furthermore, the used absorbent can be temporarily stored prior to being mixed with the regeneration gas.

Another object of the invention is a device intended for regeneration of a used absorbent from thermal generator fumes treatment, comprising a regeneration means working in a reducing atmosphere by contacting a regeneration gas with the used absorbent, associated with a filtration means, said means comprising an inlet for the used absorbent, an outlet for the gases and an outlet for the regenerated absorbent.

In particular, the device further comprises a means intended for partial combustion of the regeneration gas and a means for mixing the regeneration gas with the used absorbent, arranged upstream from the used absorbent inlet of the regeneration means.

Besides, the regeneration means can comprise an additional inlet for a regeneration gas.

The device furthermore comprises a means for cooling the gases coming from the regeneration means, whose inlet is connected to the gas outlet.

The cooling means can specifically comprise an outlet connected to an inlet of a Claus plant.

Advantageously, the device according to the invention also comprises a filtration means intended to separate the used absorbent from the effluents at low temperature (T<500° C.) before they enter the regeneration-filtration means, said means being arranged upstream from the regeneration means in relation to the direction of flow of the absorbent.

In particular, the device according to the invention comprises a means intended for storage of the used absorbent, arranged upstream from the used absorbent inlet in the regeneration means.

The sole FIGURE of the Drawings represents an apparatus used for carrying out the process of the invention.

Other features, details and advantages of the present invention will be clear from reading the description hereafter, given by way of non limitative example, with reference to the accompanying single drawing.

DETAILED DESCRIPTION

In this FIGURE, reference number 1 shows a dust separator allowing to filter the fumes of a boiler, of a furnace or of any thermal generator that specifically burns sulfur-containing liquid or gaseous fuels.

The outlet of such a boiler, as described in patent application FR-2,671,855, can thus constitute the inlet of filtering element 1. The outlet of any other means generating polluted effluents and equipped with the same fumes desulfurization means can of course constitute the inlet of element 1.

Dust separator 1, which is however not essential for the smooth running of the device according to the invention, allows a first separation of the fumes coming out of a stack 2 and the used absorbent having absorbed the sulfur oxides.

The used absorbent is thus discharged gravitationally from filtration means 1 through specific lines 3 and 4. Valves 5 and 6 or any other equivalent means placed on lines 3 and 4 can allow the used absorbent to be temporarily stored in element 1. A single used absorbent discharge line 4 can be provided without departing from the scope of the invention.

A carrier fluid, fed through lines 22, 23, can be mixed with the used absorbent downstream from valves 5 and 6, respectively, in order to ensure pneumatic transport thereof. According to an embodiment of the invention, one of the discharge lines intended for the used absorbent (line 3) is used for recycling part of the absorbent to the boiler. In any case, a line 4 is provided to convey all or part of the absorbent to a storage hopper 9 used as a buffer to uncouple the operation of the regenerator from that of the thermal generator. This hopper is also used for increasing the seal between the (oxidizing) fumes circuit and the (reducing) regeneration gas circuit by preventing passage from one into the other. The safety of the device is thus increased by preventing spontaneous ignition or explosion risks.

The carrier gas in line(s) 3, 4 can be air or a gas with a low oxygen content or without oxygen, such as fumes, so as to prevent the presence of oxygen in hopper 9. This allows to avoid possible combustion or explosion risks if regeneration gases happen to enter said hopper 9. Said hopper 9 is preferably provided, but it is not obligatory.

The used absorbent leaves hopper 9 through a line 10 that comprises for example a rotary lock or a valve means 11 and it is sent through pneumatic transport means to a filter-reactor 12. The gas used for carrying the used absorbent preferably consists of the regeneration gas, delivered through a line 13 that opens into line 11. This gas, referred to as regeneration gas, whose temperature ranges between 700 and 1500° C., preferably between 900 and 1100° C., is preferably obtained by partial combustion of $H_2S$, fed from line 24, in a burner 14 arranged on line 13. The sensible heat of the gas in line 13 is sufficient to heat the used absorbent prior to feeding it into filter-reactor 12. According to another possible embodiment, the used absorbent can be mixed with the regeneration gas at the inlet of the filter-reactor. This is for example the case when connection line 13 between regeneration gas partial combustion device 14 and filter-reactor 12 is reduced to its simplest expression. This configuration allows to limit thermal wall losses and contributes to improving the overall energy performance of the plant.

Still with a view to reducing thermal losses, the used absorbent and the regeneration gas can also be mixed directly inside the filter-reactor. In this case, the filter-reactor comprises a first mixing zone supplied by two distinct used absorbent and regeneration gas circuits; this first mixing zone is followed by the filtering elements proper.

The most part of the used absorbent, carried along by the carrier gas, clings to the filtering elements of filter-reactor 12 where it forms a cake. This cake can be periodically unclogged by means of a device 15 which momentarily creates a back pressure downstream from the filtering elements by means of a sudden injection of a certain amount of regeneration gas or of a neutral gas such as nitrogen. The filter-reactor preferably consists of several sections, each section comprising one or more filtering elements. With this configuration, the sections can be unclogged one after the other and not simultaneously. Surges are thus minimized, which improves the stability of the plant and facilitates its operation.

Unclogging causes the cake to fall into the lower part of filter-reactor 12 where an accumulation forms.

Fresh regeneration gas can possibly be fed into the lower part of filter-reactor 12 through a specific line 16. A pseudo fluidized bed is thus formed, wherein the regeneration reaction progresses.

The regeneration gas leaves filter-reactor 12 through a line 17. Part of the sensible heat of this gas is recovered in a heat exchanger 18 arranged on line 17. This heat can for example be used for generating steam used on the site. Heat exchanger 18 can be advantageously equipped with a liquid sulfur recovery means, this liquid sulfur having formed during the stage of partial combustion of the regeneration gas and during regeneration of the absorbent. The liquid sulfur is discharged through a line that is not shown in the figure and sent to the circuit of a Claus plant for example.

At the outlet of heat exchanger 18, the regeneration gas can be carried to a Claus plant through a line 19. Considering its composition, the regeneration gas can be introduced directly into the first sulfur condenser of the Claus plant (not shown).

The present invention thus allows to use as a regeneration gas hydrogen sulfide that is always present in large amounts in refineries, and normally processed in a Claus plant to be converted to sulfur.

The present invention thus allows to raise the treating capacity of the Claus plant by using part of the hydrogen sulfide intended for the Claus plant for regeneration of the used absorbent.

The regenerated absorbent is discharged in the lower part of filter-reactor 12 through a line 20 that comprises for example a rotary lock and an ejector. A pneumatic carrying gas flows into line 20 via a line 21. The regenerated absorbent can for example be carried to the desulfurization zone of a boiler or to a temporary storage point.

A beneficial effect linked with the invention is obtained through partial combustion of the hydrogen sulfide contained in the regeneration gas: the formation of hydrogen through dissociation, during combustion of $H_2S$, allows to enrich the regeneration gas in $H_2$, which allows to raise the conversion coefficient of the regeneration reaction.

Besides, recycling of the regeneration gas is no longer necessary, which allows to cut out certain constituents such as a draft ventilator. In fact, the gaseous effluent resulting from the absorbent regeneration can be sent to a Claus plant upstream or downstream from the first condenser.

A quantified embodiment example is described hereafter in connection with the figure.

A 5094 kg/h flow of used absorbent is extracted from dust separator 1 through line 4. This absorbent has a mass sulfation ratio of 58% and a temperature of 180° C. It is sent by pneumatic transport into hopper 9 by using 5100 kg/h desulfurized fumes as the carrier fluid.

A 3510 kg/h flow of $H_2S$ is fed through line 24 into burner 14 where it is partly oxidized by a 4000 kg/h air stream. The fumes obtained are discharged through line 13. They are at a temperature of 1128° C. and contain 15% $H_2S$ by weight, 0.4% $H_2$ by weight, 1.2% $SO_2$ by weight and 29% sulfur by weight. These fumes are mixed with the used absorbent extracted from hopper 9 through line 11 and fed into filter-reactor 12. The inlet temperature is 790° C.

The regenerated absorbent is extracted from filter-reactor 12 through line 20. This absorbent has a flow rate of 3900 kg/h, a sulfation ratio of 26% and a temperature of 680° C.

The gas used for regeneration is extracted from filter-reactor 12 through line 17. It is cooled to 350° C. by exchanger 18. This gas has a flow rate of 8700 kg/h and contains 12% $SO_2$ by weight, 12.7% $H_2S$ by weight and 25.4% sulfur by weight.

It is well-known that the regeneration gas and the used absorbent must be brought to a temperature ranging between 600° C. and 1000° C. to allow the regeneration reaction to take place. In the prior art, heating is provided by means of an exchanger followed by an oven. According to the present invention, the regeneration gas is advantageously heated by partial combustion of hydrogen sulfide, which allows the regeneration gas to be brought to a temperature above 1000° C. The used absorbent is heated by mixing the gas and the absorbent prior to feeding it into the regeneration unit. This heating means thus allows to cut out two costly equipments of the regeneration circuit: the exchanger and the preheating oven.

This economic advantage is quite interesting, all the more so because it is not detrimental for the regeneration efficiency or any other working parameter of the plant.

What is claimed is:

1. A process for regeneration of a used absorbent from a desulfurization zone or from the desulfurization of any gas containing sulfur oxides, said regeneration being carried out simultaneously with filtering of said absorbent in a reducing atmosphere, characterized in that it comprises carrying out partial combustion of a regeneration gas upstream from said regeneration and in that the products of said partial combustion are mixed with the used absorbent prior to the regeneration-filtration stage, and in that the used absorbent is fractionated, prior to being mixed with the regeneration gas, into at least two fractions, some of said fractions being rich in catalyst, the others being poor in catalyst.

2. A process as claimed in claim 1, characterized in that said regeneration is carried out in a filter-reactor and in that the process further comprises mixing additional regeneration gas during the regeneration-filtration stage, in the filter-reactor.

3. A process as claimed in claim 1, characterized in that said regeneration gas comprises hydrogen sulfide and/or a hydrocarbon.

4. A process as claimed in claim 1, characterized in that the gases from the regeneration-filtration stage are cooled.

5. A process as claimed in claim 4, characterized in that the cooled gases are sent to a Claus plant.

6. A process as claimed in claim 1, characterized in that the regenerated absorbent from the regeneration-filtration stage is mixed with a carrier gas, then sent to a storage unit.

7. A process as claimed in claim 1, characterized in that the regenerated absorbent is mixed with a carrier gas, then sent to a desulfurization zone.

8. A process as claimed in claim 1, characterized in that said regeneration is carried out in the presence of a catalyst.

9. A process as claimed in claim 8, characterized in that the catalyst used for said regeneration comprises copper oxide and/or cerium oxide.

10. A process as claimed in claim 1, characterized in that said catalyst-rich fractions are recycled to a desulfurization zone, and said catalyst-poor fractions are directly sent to the regeneration zone.

11. A process as claimed in claim 1, characterized in that said catalyst-rich fractions are recycled to a desulfurization zone, and said catalyst-poor fractions are separated into two streams, one being recycled to a desulfurization zone, the other being sent to the regeneration zone.

12. A process as claimed in claim 1, characterized in that the used absorbent is temporarily stored prior to being mixed with the regeneration gas.

* * * * *

UNITED STATES PATENT AND TRADEMARK OFFICE

CERTIFICATE OF CORRECTION

PATENT NO. : 6,960,548 B2
DATED : November 1, 2005
INVENTOR(S) : Lebas et al.

It is certified that error appears in the above-identified patent and that said Letters Patent is hereby corrected as shown below:

Tilte page,
Item [73], Assignee, should read -- Institut Francais du Petrole, Rueil Malmaison Cedex (FR) --.

Signed and Sealed this

Seventh Day of February, 2006

JON W. DUDAS
*Director of the United States Patent and Trademark Office*